June 12, 1951   S. H. LAMPORT   2,556,476
MACHINE FOR SEAMING THERMOPLASTIC MATERIAL
Filed June 14, 1949   5 Sheets-Sheet 1
FIG. 1.
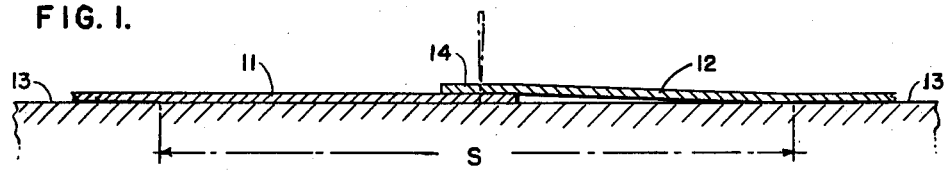
FIG. 2.
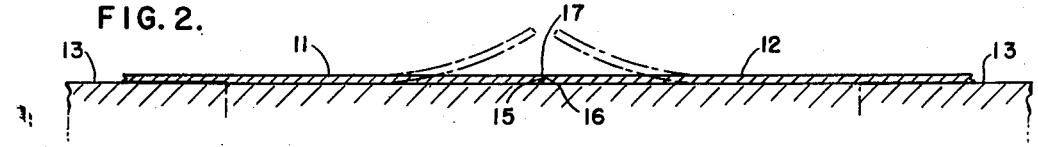
FIG. 3.
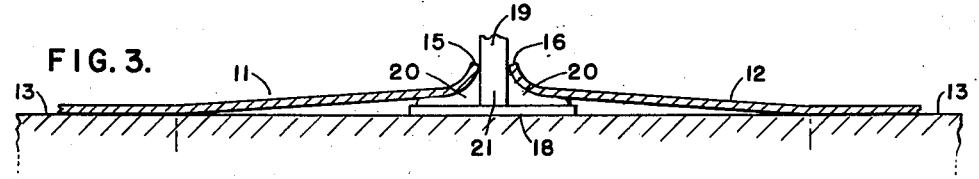
FIG. 4.
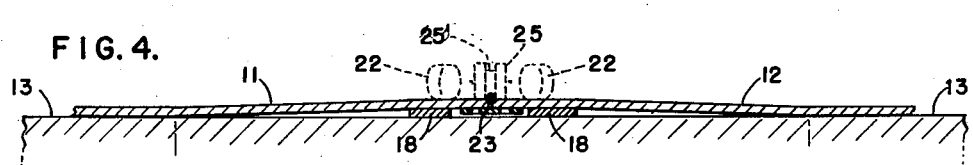
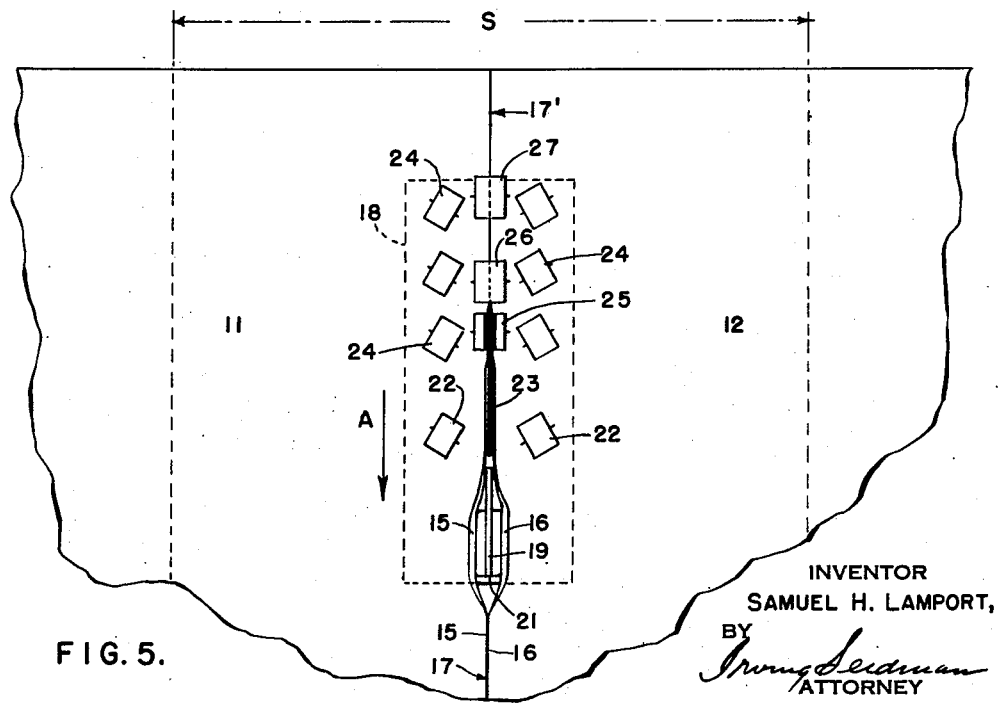
FIG. 5.
INVENTOR
SAMUEL H. LAMPORT,
BY
Irving Seidman
ATTORNEY June 12, 1951  S. H. LAMPORT  2,556,476
MACHINE FOR SEAMING THERMOPLASTIC MATERIAL
Filed June 14, 1949  5 Sheets-Sheet 2
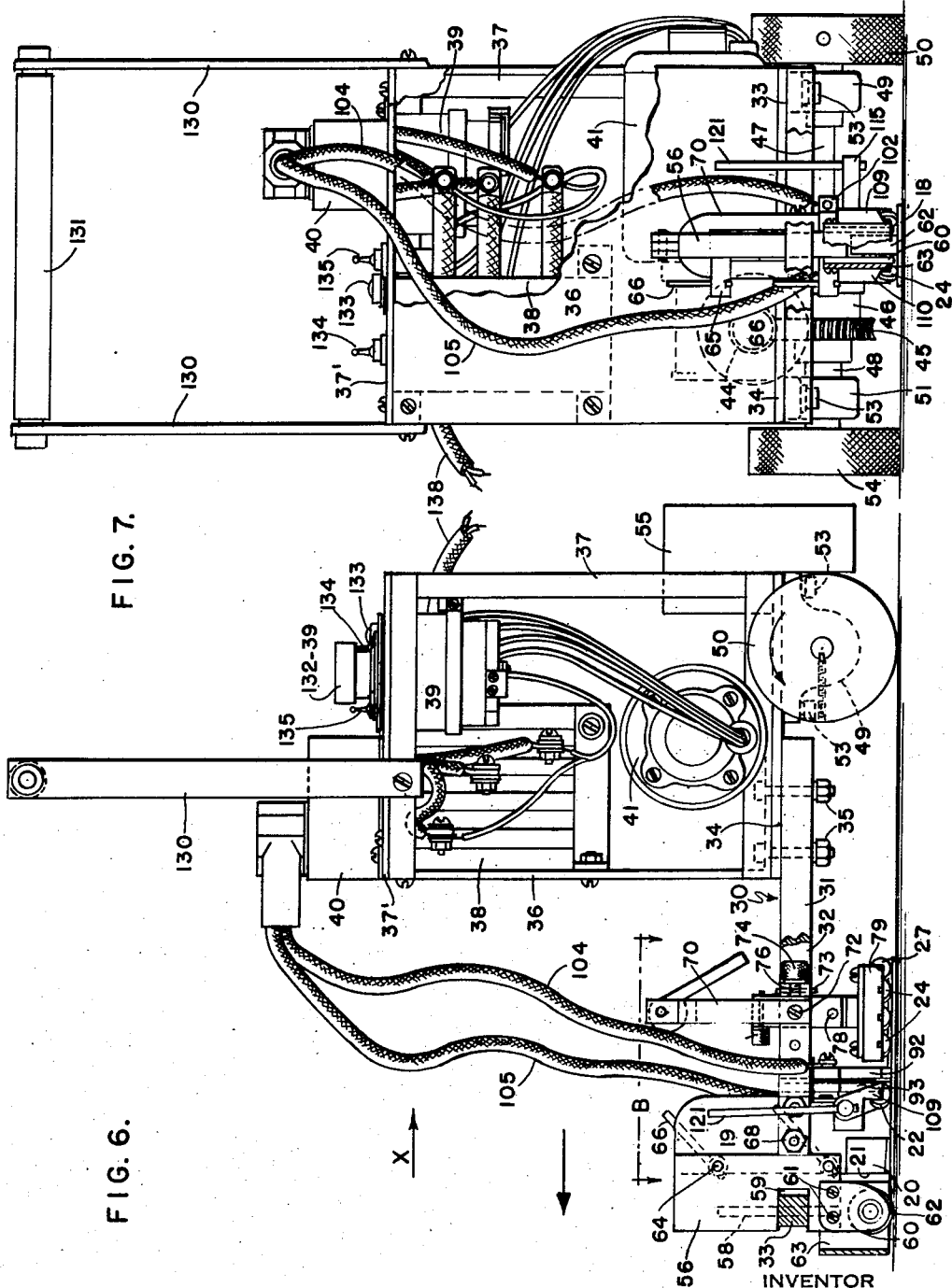
INVENTOR
SAMUEL H. LAMPORT,
BY
Irving Seidman
ATTORNEY

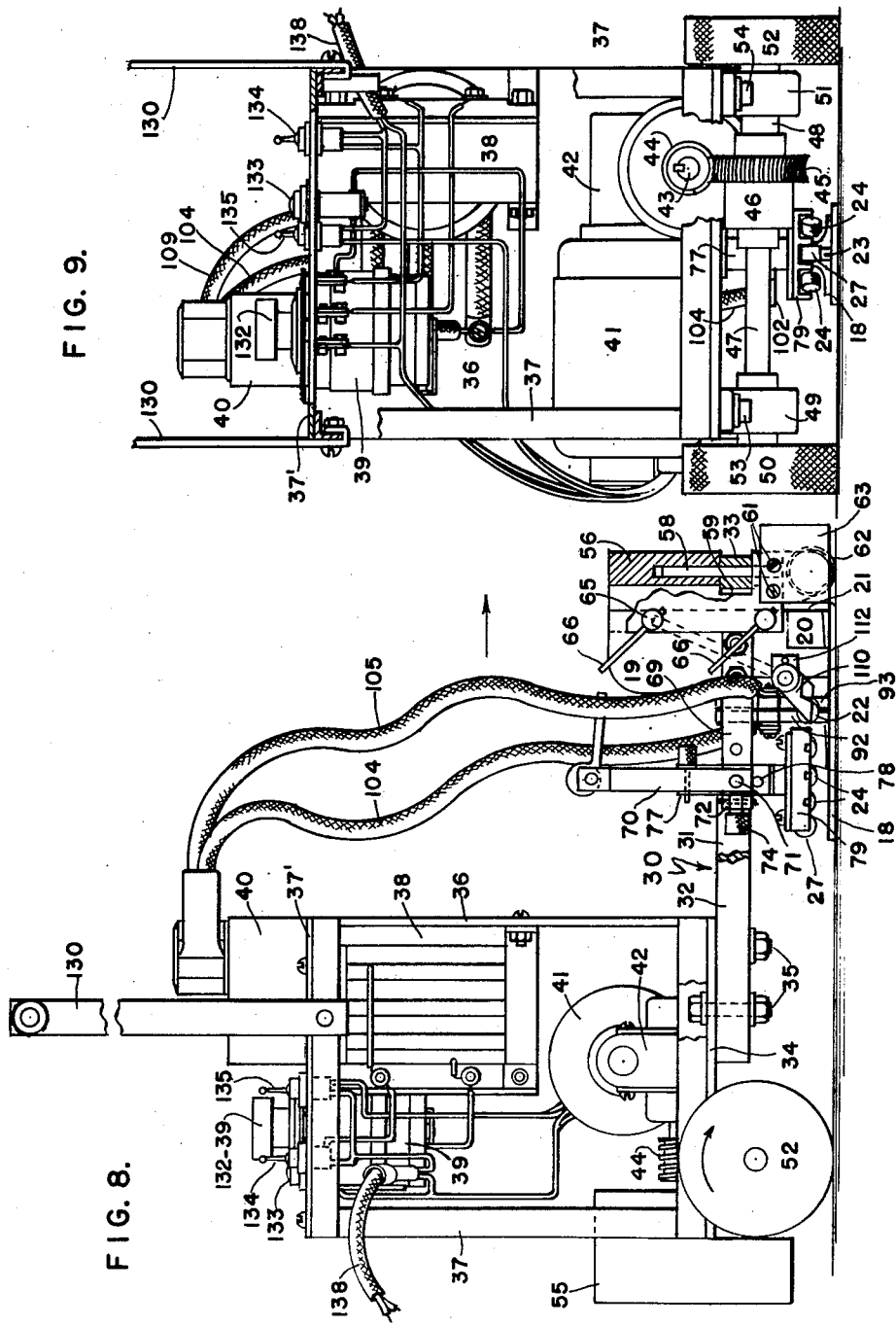

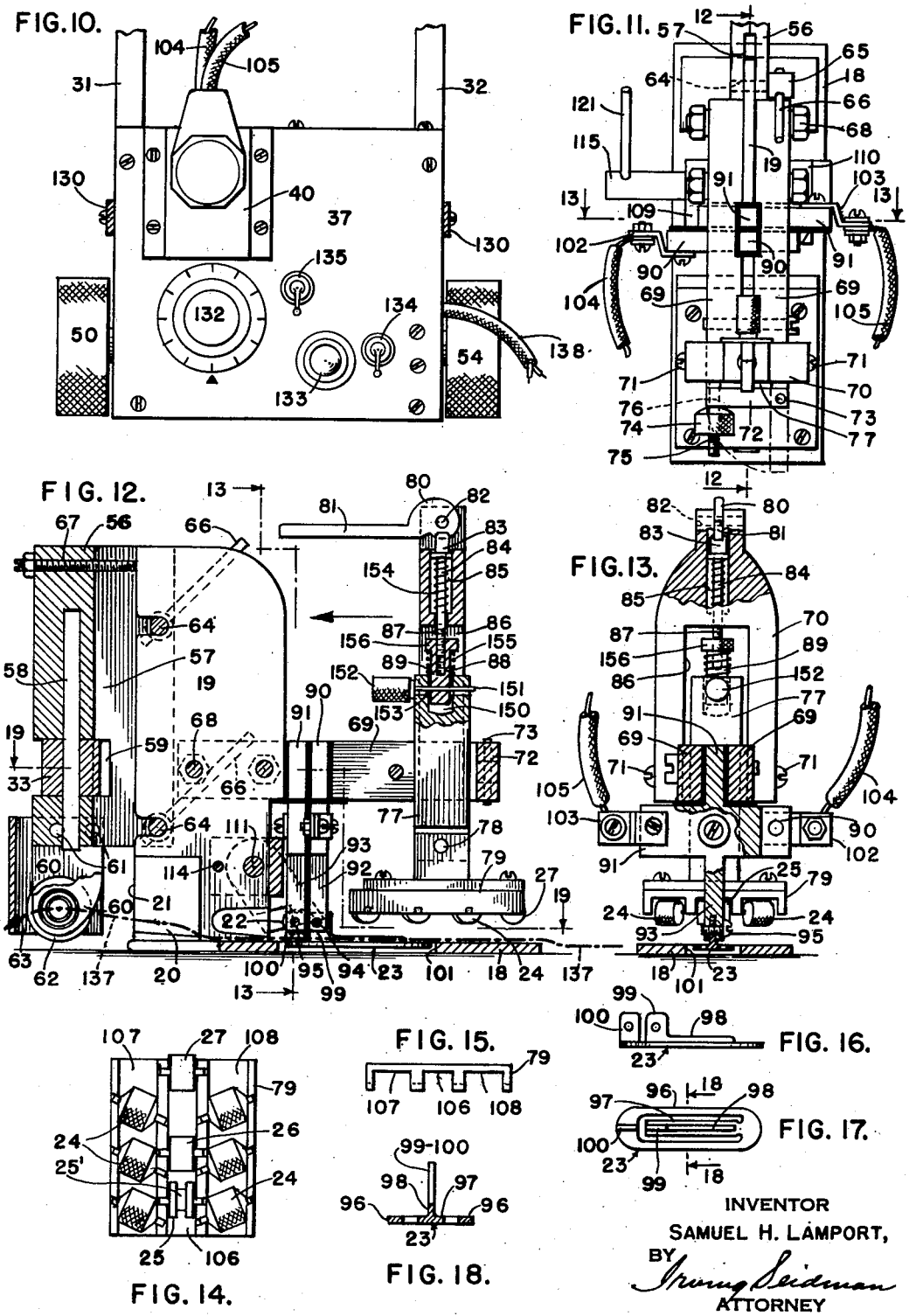

June 12, 1951 S. H. LAMPORT 2,556,476
MACHINE FOR SEAMING THERMOPLASTIC MATERIAL
Filed June 14, 1949 5 Sheets-Sheet 5
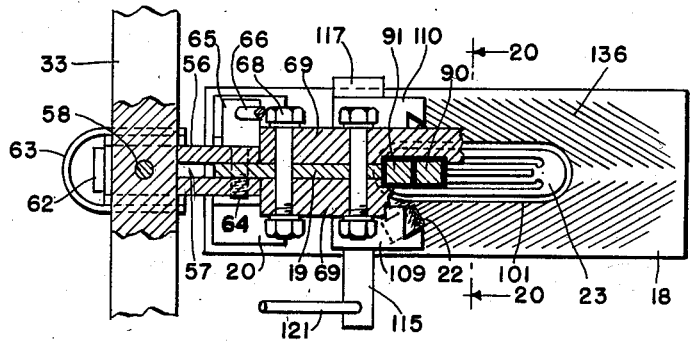
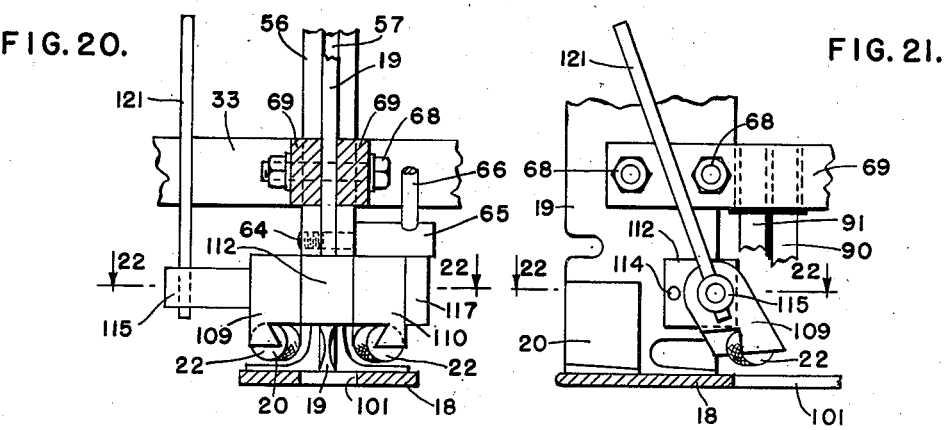
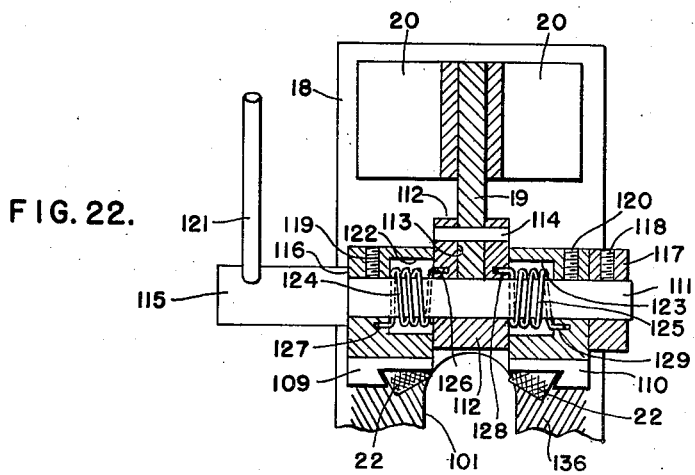
INVENTOR
SAMUEL H. LAMPORT,
BY
Irving Seidman
ATTORNEY Patented June 12, 1951

2,556,476

UNITED STATES PATENT OFFICE 2,556,476

MACHINE FOR SEAMING THERMOPLASTIC MATERIAL

Samuel H. Lamport, Southbridge, Mass., assignor to Golding Bros. Company, Inc., New York, N. Y., a corporation Application June 14, 1949, Serial No. 98,902

8 Claims. (Cl. 154—42)

This invention relates to apparatus for sealing the seams of thermoplastic material and has particular reference to a machine for sealing the seams of thermoplastic floor material by fusion-welding the abutting edges of same after the flooring material has been laid and partially cemented or otherwise attached to a floor.

An object of this invention is to provide a simple apparatus for fusion-welding the abutting edges of a thermoplastic floor covering, after same has been laid, and produce by said machine a monolithic sheet.

A further object of this invention is to provide an apparatus for fusion-welding abutting edges of sheets of thermoplastic material to form a sealed seam at the abutting edges.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawings, in which:

Fig. 1 is a schematic sectional view of adjoining strips of thermoplastic floor covering material partially attached to a floor and having the edges lapped.

Fig. 2 is a schematic sectional view showing the abutting edges of the thermoplastic floor covering after cutting has been accomplished.

Fig. 3 is a similar sectional view but shows the introduction of a part of a fusion-welding machine which will be hereinafter fully described.

Fig. 4 is a similar diagrammatic sectional view showing a further step in the method and will be hereinafter fully described.

Fig. 5 is a diagrammatic plan view showing the position of the fusion-welding machine as it moves between the abutting edges of a thermoplastic sheet of material and will be hereinafter fully described.

Fig. 6 is an elevational side view of the apparatus for fusion-welding and sealing the seam of a thermoplastic material and shows portions broken away.

Fig. 7 is an elevational view of the front or leading end of the apparatus looking in the direction indicated by the arrow X in Fig. 6 and has parts broken away.

Fig. 8 is an elevational view of the side opposite to that shown in Fig. 6 and has parts broken away.

Fig. 9 is an elevational view of the rear end of the apparatus and has parts broken away.

Fig. 10 is a partial plan or top view of the apparatus.

Fig. 11 is an enlarged partial plan or top view of a part of the apparatus within the bracket line B of Fig. 6, and will be hereinafter fully described.

Fig. 12 is an enlarged longitudinal sectional elevation of the part shown in Fig. 11 and is taken along the line 12—12 of Fig. 11.

Fig. 13 is a transverse sectional elevation taken along line 13—13 of Figs. 11 and 12.

Fig. 14 is a bottom view of a roller block and rollers forming a part of the apparatus.

Fig. 15 is an end view of the said roller block but without the rollers.

Fig. 16 is a longitudinal elevation of a heater unit forming a part of the device.

Fig. 17 is a plan or top view of same.

Fig. 18 is an enlarged transverse section taken along the line 18—18 of Fig. 17.

Fig. 19 is a sectional plan view taken along line 19—19 of Fig. 12.

Fig. 20 is a transverse sectional elevation taken along line 20—20 of Fig. 19.

Fig. 21 is a side elevational view of the part shown in Fig. 20.

Fig. 22 is a sectional plan view (enlarged) taken through line 22—22 of Figs. 20 and 21.

Method

The method and apparatus hereinbefore generally and hereinafter more fully described may be employed to fusion-weld the abutting ends of thermoplastic materials with the object of joining the parts into a monolithic whole. However, the embodiment illustrated in the drawings and now to be described has particular reference to sealing the seams of strips of thermoplastic floor covering, by fusion-welding the abutting edges of the strips after they are laid and partially cemented to a floor to form the said floor covering into a monolithic whole.

In Figs. 1 to 5, inclusive, there is shown the successive steps involved in the method of fusion-welding the abutting ends of a thermoplastic floor covering which has already been laid and partially cemented to a floor. Strips of thermoplastic floor covering 11 and 12 are partially cemented to a floor surface 13 and are so laid that the edges of the strips overlap as at 14. The said strips are attached to the floor 13 almost throughout their entire area leaving a margin S (Fig. 1) along their edges so that the said edges may be freely turned upwardly as shown by the dot-dash lines in Fig. 2. As a first step in the method, a cut is made through the lapped portion 14 of the thermoplastic strips 11 and 12 as indicated by the dot-dash lines in Fig. 1. When so cut abutting edges 15 and 16 are formed which fit closely together as at 17, Fig. 2. At this point the said abutting edges are raised as shown by the dot-dash line in Fig. 2 and a foot plate portion 18 of the fusion apparatus is introduced under the said free portion of the said strips 11 and 12. A standard 19, partly shown in Fig. 3 is formed upon the said portion 18 and has guide blocks 20 to direct the free edges upwardly. The part 18 and its standard 19, together with the entire apparatus, hereinafter fully described, moves forward or towards the observer of the views in Figs. 2, 3 and 4 and as indicated by the arrow A in Fig. 5.

As the apparatus moves forward, the front of a fender 63 acts as a leading edge to part and turn up the edges 15 and 16 of the strips 11 and 12. The said standard 19 then follows and passing the turned up edges brings the rollers 22 into contact with said edges 15 and 16 and forces them downwardly into contact with an electrically energized heating element 23, suitably carried upon and bracketed to the said standard 19 at which point the abutting edges 15 and 16 are heated and properly softened. Rollers 24 are mounted and angularly arranged to urge the abutting edges 15 and 16 into close contact for fusing after the heating element 23 has passed on. A slotted roller 25 is provided to press down upon the said edges 15 and 16 to hold them in close contact upon the said heating element 23. Following rollers 26 and 27 hold the edges firmly in place as the heated and softened edges cool and become fusion-welded. After the passage of the roller 27 the edges have fused and cooled to form the finished seam 17' indicated in Fig. 5. The rollers further act to form an even and level juncture at 17'.

Apparatus

Referring now to the apparatus to be employed to effect the fusion-welding above described, Figs. 6 to 22, inclusive, 30 designates a carrier frame comprising side bars 31 and 32, a front cross bar 33 and a base plate 34 extending rearwardly from and secured to the rear ends of the said side bars 31 and 32 by means of bolts 35. An upright plate 36 is secured to the front edge of the said base plate 34 and upright angle irons 37 are secured at the rear corners of the said base plate. A top plate 37' rests upon and is secured to the said upright front plate 36, all forming a cage within which there is mounted a fixed voltage transformer 38, a variable voltage transformer 39, a connection box and plug receptacle 40, a motor 41 and a speed reducing unit 42. The shaft 43 of the speed reducing unit 42 carries a worm gear 44, which, coacting with a gear wheel 45 and a differential unit 46, rotates the split shaft 47—48. One section 47 of the said split shaft is mounted in a bearing block 49 and has fixedly mounted upon its outer end a traction wheel 50, the peripheral surface of which is knurled to afford good traction when the wheel rotates. The other section 48 of the said split shaft is similarly mounted in a bearing block 51 and has secured upon its outermost end, a traction wheel 52 which also has a knurled peripheral surface. The said bearing blocks 49 and 51 are secured to the underside of the aforesaid base plate 34 by bolts 53 and 54 respectively. A detachable weight block 55 may be mounted upon the rear of said base plate to give added traction to the drive wheels 50 and 52.

At the front end of the carrier frame 30, upon the cross bar 33 there is pivotally attached a carrier block 56 vertically slotted at its rear end to form a recess 57. The said carrier block 56 is held upon the said cross bar 33 by means of a pin 58. A cut-out portion 59 extends rearwardly to allow oscillating movement to the said carrier block 56. A pair of depending cheek pieces 60 are attached to the lower end of said carrier block 56 by means of screws 61 and carry between them a roller 62. The screws 61 also hold in place a guard or fender 63 which encloses the said roller 62. Threaded pins 64 engage through the recess portion 57 of the carrier block 56 and form a support for the aforesaid standard 19. The pins 64 are provided with hubs 65 (Figs. 7, 8 and 11) having radially extending handles 66 with which the threaded pins 64 may be turned to tightly clamp the said standard 19 to the said carrier block 56. A set screw 67 engages through the carrier block 56 and may be adjusted to limit the movement of the said standard 19 into the recess 57.

Extending rearwardly from the standard 19 and secured thereto by means of bolts and nuts 68, are bracket bars 69 which carry upon their outer ends an inverted U-shaped or yoke member 70 secured to the said bracket bars 69 by means of screws 71. A gate or swinging member 72 is hinged to one of the said bracket bars 69, as at 73, and is held closed against the adjoining bracket bar by means of a thumb nut 74 upon a threaded stem 75 which in turn is attached to the bracketed bar and engages a slot 76 formed upon the said gate 72. By removing the thumb nut 74, the gate may be swung open as indicated by the dot-dash line in Fig. 11. The said gate 72 acts as a lock to hold in place a plunger 77 which is adapted to vertical, reciprocal movement within the said yoke member 70. At the lower end of the said plunger 70 there is, pivotally attached as at 78, a roller block 79 carrying rollers 24, 25, 26 and 27, already mentioned, and hereinafter further described.

A cam 80, formed with an operating lever 81, Figs. 12 and 13, is pivotally attached as at 82 in the slotted upper end of the said yoke member 70 and engages a grooved head 83 of a cam follower pin 84. The said pin 84 engages through a pocket 85 formed in the said yoke member 70. From the pocket 85 the said pin 84 extends into a space 86 between the legs of said yoke member 70. The lower portion of the said pin 84 is threaded as at 87, and engages a threaded bore 88 in a compression stud 89, the lower end of which engages loosely in a bore 150 formed in the upper end of said plunger 77. A pin 151, having a knurled head 152, is held by frictional contact in a bore in the lower end of said compression stud 89 and engages through vertically slotted perforations 153 in the said plunger 77.

A retracting spring 154 engages around the said cam follower pin 84 and is disposed between the bottom of said pocket 85 and the under side of said head 83 to urge the said cam follower pin 84 and its attached compression stud 89, upwardly. The upward movement of the said compression stud draws upwardly, by the contact of pin 151 with the upper portion of the said vertically slotted groove 153, the said plunger 77 and its attached roller block 79 and the rollers mounted thereon. A downward force is exerted upon the top of the said plunger 77 by a plunger compression spring 155 disposed between a shoulder 156 on the compression stud 89 and the top of the said plunger 77.

As the plunger compression stud 89 is forced down by the action of the cam 80 and the cam follower pin 84, the plunger compression spring 155 exerts a spring load on the plunger 77 pushing it and the roller block attached thereto, down against the abutting areas of said strips 11 and 12, which are supported underneath by the said foot plate 18.

The arrangement of the parts, as shown and described, is such that all the downward force on the plunger 77 is exerted by the plunger compression spring 155, as the pin does not reach the bottom portion of the slot 153. When the pressure on the cam follower pin 84, by a reverse rotation of the cam 80 about its pivotal connection 82 is released, the retracting spring 154 forces the cam follower pin 84 upward with the plunger compression stud 89 which is attached thereto. As the said plunger compression stud 89 rises, it carries the pin 151 with it, which, as it rises, coacts with the top portion of the vertical slot 153 in the plunger 77 and carries it and the roller block 79 upward and out of contact with the abutting areas at the seam of the strips 11 and 12.

Held between the bracket bars 69 at a point about midway of their length, are cross shaped conducting members 90 and 91 insulated from each other and from the said bracket bars 69. The downwardly extending legs 92 and 93 of same carry upon their lower ends, the heating element 23, heretofore mentioned (Figs. 11, 12 and 13) and are secured to the said legs 92 and 93 by screws 94 and 95 respectively. The heating element 23 comprises an oblong member of high electrical resistance material and is formed with an outer rim 96 and an inner longitudinally projecting prong 97 (Figs. 16, 17 and 18), the prong being formed with an upwardly extending ridge 98 and has an upwardly extending lug 99 while the outer rim 96 is formed with an upwardly extending lug 100. The said lugs 99 and 100 provide a means of connection with the legs 92 and 93 respectively. A perforation or orifice 101 is formed in the aforesaid foot-plate 18 in which the said heating element 23 is suspended. Attachment lugs 102 and 103 (Fig. 11) are secured to the said conductor members 90 and 91 respectively to which conductor leads 104 and 105 are respectively connected.

The roller block 79 heretofore mentioned, is formed with channels 106, 107 and 108 (Figs. 14 and 15) and pressure rollers 24 are angularly mounted in the channels 107 and 108 and have knurled peripheral surfaces. Pressure rollers 25, 26 and 27 are mounted in channel 106 and are arranged in straight alignment with the movement of the said foot plate 18 and exert a downward pressure directly over the seam or abutting edges 15 and 16 of the said thermoplastic material. The roller 25 is formed with a peripheral groove 25' to ride over the ridge 98 in the said heating element 23. The leading pressure rollers 22, hereinbefore mentioned, are carried by depending members 109 and 110 (Figs. 20, 21 and 22) which are fixed upon a shaft 111, in turn mounted in a bearing block 112. The said bearing block 112 is slotted at 113 and engages over the aforesaid standard 19 to which it is fixed by a pin 114. The said shaft 111 has a broadened outer end 115 to form a shoulder 116 which engages the side of the depending member 109 and has, upon its opposite end, a collar 117 which is secured to the shaft 111 by a set screw 118. Set screws 119 and 120 fix the depending members 109 and 110 respectively upon the said shaft 111. A pin or handle 121 is secured to the end 115 of the said shaft 111 and affords a means for turning said shaft. Pockets 122 and 123 are formed in the said depending members 109 and 110 respectively, and provide a housing for spiral springs 124 and 125 which encircle the said shaft 111 as clearly shown in Fig. 22. One end of the spring 124 is anchored to the said bearing block 112 at 126, while the opposite end of same is anchored to the depending roller carrier member 109 at 127. One end of the spring 125 is anchored to the said bearing block 112 at 128 while its opposite end is anchored to the depending roller carrier member 110 at 129. The said rollers 22 are mounted in the said depending members 109 and 110 in angular alignment relatively to the line of movement of the apparatus along the seam of the thermoplastic material to be fused.

Upwardly extending straps 130 are attached to the top plate 37 and have a handle bar 131 secured to their upper ends to provide a carrying or lifting means as well as an operator's guide. In the top plate 37 there is mounted a knob 132 with which the variable voltage transformer 39 is controlled. A pilot light 133 is mounted upon and insulated from the said top plate. A switch 134, to control the current to the said heating element 23, is also mounted upon the said top plate as well as a switch 135 which controls the current to the motor 41. The various electrical units heretofore mentioned, the circuits connecting same, and their control switches, are conventional, and the circuits, while partly shown in the drawings, are not described as they do not involve invention.

*Operation*

As already partly set forth in the description of the method involved in fusion-welding a thermoplastic floor covering, the foot plate 18 is introduced beneath the abutting edges 15 and 16 of the thermoplastic floor covering. As the motor drives the apparatus forward the lead end 21 of the standard 19, parts the abutting edges and the rollers 22 urge the same together again, as the apparatus continues its movement to bring said edges into contact with the heating element. As the said apparatus moves forward, the heating element heats and softens the said abutting edges sufficiently to cause their fusion. As the apparatus continues its movement, the pressure rollers 24 urge the said edges into closer contact. At this point, the roller 25 firmly presses the said abutting edges downwardly and the following rollers 26 and 27 exert a further downward pressure and complete the fusion-welding of the two abutting edges, leaving a smooth and even seam, as at 17' (Fig. 5).

While the foregoing description has been confined to fusion-welding a floor covering after same has been laid and partially attached to a floor, the method apparatus described, with slight detail modifications, may be adapted for fusion-welding sections of thermoplastic material not laid upon a floor. Sections of thermoplastic material in various forms may be fusion-welded into larger sections and may then be fusion-welded into large monolithic whole sections and the operation may be performed upon work tables and the like.

To facilitate their action, the rollers 22, 24, and 25 have knurled peripheral surfaces which, coacting with angular grooves 136 (Fig. 19) upon the foot plate 18, tend to urge the said abutting edges together as the apparatus passes along the seam. The dot-dash line 137 (Fig. 12) indicates the approximate position in the apparatus of the thermoplastic material to be fusion-welded. Current is fed from its source by means of the conductor 138. The pivotally connected carrier block 56 with its attached roller 62 acts as a tiller and coacting with the differentially mounted drive wheels 50 and 54 tends to keep the apparatus in proper alignment with the seam as it moves along the same.

I claim:

1. In an apparatus for fusion-welding the abutting edges of thermoplastic material, comprising a carrier frame mounted upon wheels, a standard upon the front of said carrier, a foot plate formed upon the lower end of said standard and adapted to move along the under surface of adjoining edges of sections of thermoplastic material to be fusion-welded, bracketed bars attached to and extending from the said standard, a plunger reciprocally mounted upon the outer ends of said bracketed bars, a roller block pivotally mounted upon the lower end of said plunger, pressure rollers in said roller block, means for holding the said plunger and attached roller block in a raised or lowered position, a pair of insulated current conducting members attached to and extending downwardly from said bracketed bars, a heating element attached to and having electrical connection with the said current conducting members, the said heating element being suspended within an orifice in said foot plate and being insulated therefrom, a motor mounted upon said carrier frame to motivate the said apparatus, and means for supplying current from its source.

2. An apparatus for fusion-welding the abutting edges of thermoplastic material as defined in claim 1, including adjustable depending members pivotally mounted upon the said standard and carrying knurled guide rollers thereon adapted to urge the edges of the thermoplastic material together as the apparatus moves forward.

3. An apparatus for fusion-welding the abutting edges of thermoplastic material as defined in claim 1, including a carrier block pivotally mounted upon said carrier frame and detachably carrying the said standard, a lead roller upon the said pivotally mounted carrier block and wherein the said wheels upon the carrier frame are mounted with a differential gear unit and adapted, coacting with the said lead roller, to maintain a proper alignment with the seam of the thermoplastic material, of the said apparatus as it moves along the said seam.

4. An apparatus for fusion-welding the abutting edges of thermoplastic material as defined in claim 1, including a carrier block pivotally mounted upon the said carrier frame and detachably carrying the said standard, threaded pins engaging through the said pivotally mounted carrier block and its attached standard to hold same in place thereon or permit its removal therefrom.

5. An apparatus for fusion-welding the abutting edges of thermoplastic material as defined in claim 1, including a pilot light illuminated when the said heating element is electrically activated.

6. An apparatus for fusion-welding the abutting edges of thermoplastic material as defined in claim 1, including pressure rollers upon the said roller block adapted to level and smooth the welded seam of said thermoplastic material.

7. An apparatus for fusion-welding the abutting edges of thermoplastic material as defined in claim 1, including a gate provided upon the ends of said bracketed bars adapted to swing open to permit the removal of said plunger and its attached roller block and a finger operated locking screw to hold the gate in closed position.

8. An apparatus for fusion-welding the abutting edges of thermoplastic material as defined in claim 1, wherein the said foot plate has angularly arranged grooves formed thereon adapted to facilitate the movement of the abutting edges of the thermoplastic material together as the said apparatus moves along the seam formed by the abutting edges.

SAMUEL H. LAMPORT.

REFERENCES CITED

The following references are of record in the file of this patent:

UNITED STATES PATENTS

| Number | Name | Date |
|---|---|---|
| 1,041,201 | Turner | Oct. 15, 1912 |
| 1,784,216 | Aldrich | Dec. 9, 1930 |
| 2,084,625 | Stebbins | June 22, 1937 |
| 2,220,545 | Reinhardt | Nov. 5, 1940 |
| 2,360,950 | Kilgour | Oct. 24, 1944 |
| 2,382,963 | Dodge | Aug. 21, 1945 |
| 2,516,280 | Welch | July 25, 1950 |